(12) United States Patent
Faghri et al.

(10) Patent No.: US 7,829,211 B2
(45) Date of Patent: Nov. 9, 2010

(54) THERMAL-FLUIDS MANAGEMENT SYSTEM FOR DIRECT METHANOL FUEL CELLS

(75) Inventors: Amir Faghri, Storrs, CT (US); Zhen Guo, Farmington, CT (US)

(73) Assignee: Univeristy of Connecticut, Farmington, CT (US)

( * ) Notice: Subject to any disclaimer, the term of this patent is extended or adjusted under 35 U.S.C. 154(b) by 1215 days.

(21) Appl. No.: 11/153,737

(22) Filed: Jun. 15, 2005

(65) Prior Publication Data

US 2006/0292412 A1 Dec. 28, 2006

(51) Int. Cl.
*H01M 4/94* (2006.01)
(52) U.S. Cl. .......................... 429/39; 429/34
(58) Field of Classification Search ............ 429/34, 429/44
See application file for complete search history.

(56) References Cited

U.S. PATENT DOCUMENTS

| | | | |
|---|---|---|---|
| 2003/0162070 A1* | 8/2003 | Hirsch et al. | 429/34 |
| 2004/0062979 A1* | 4/2004 | Beckmann et al. | 429/38 |
| 2004/0126643 A1 | 7/2004 | Kinkelaar et al. | |
| 2004/0151598 A1 | 8/2004 | Young et al. | |
| 2004/0151962 A1* | 8/2004 | Adams | 429/34 |
| 2004/0209133 A1* | 10/2004 | Hirsch et al. | 429/22 |
| 2004/0209136 A1* | 10/2004 | Ren et al. | 429/30 |
| 2005/0084731 A1* | 4/2005 | Nishimura et al. | 429/34 |
| 2005/0106380 A1* | 5/2005 | Gray et al. | 428/323 |
| 2005/0233190 A1* | 10/2005 | Finkelshtain et al. | 429/22 |

OTHER PUBLICATIONS

Guo et al."A Passive Fuel Delivery System for Portable Direct Methanol Fuel Cells." Journal of Power Sources 132 (2004) 86-91.

* cited by examiner

*Primary Examiner*—Patrick Ryan
*Assistant Examiner*—Muhammad Siddiquee
(74) *Attorney, Agent, or Firm*—McCarter & English, LLP (57) ABSTRACT

The present invention provides a system and method for passive thermal-fluids management in a liquid feed fuel cell. In particular, the present invention provides a system and method for passive thermal-fluids management in a direct methanol fuel cell having a methanol storage medium and a methanol and water mixing medium. The fuel cell may also include a methanol distribution medium that facilitates uniform distribution of methanol to the mixing medium and the anode, wherein the methanol and water are used for fuel by the direct methanol fuel cell.

17 Claims, 9 Drawing Sheets

THERMAL-FLUIDS MANAGEMENT SYSTEM FOR DIRECT METHANOL FUEL CELLS

BACKGROUND OF THE INVENTION

1. Field of the Invention

The present invention relates to the operation of electrochemical power cells, and in particular, a system and method for passive management of fluid reactants and byproducts within a liquid feed fuel cell, such as a direct methanol fuel cell.

2. Brief Description of the Related Art

Electrochemical power cells are well suited for a variety of applications by virtue of their efficiency, environmentally friendly nature and high power densities. There are three significant types of electrochemical power sources: primary cells, secondary cells and fuel cells. Unlike primary and secondary cells, where the reactants and products are contained within the cell, fuel cells employ reactants, which are continuously supplied to the cell; byproducts are also continuously removed. Therefore, fuel cells need an efficient fluids (i.e., reactants and byproducts) management system.

One example of a fuel cell is a direct methanol fuel cell (DMFC). The DMFC has emerged as an attractive power source for portable devices because of its high energy density in generating electrical power from fuel. DMFC systems may be divided into active and passive. Active systems use a pump and fan to feed fluids, such as methanol ($CH_3OH$) and oxygen ($O_2$), into a cell stack, where the oxygen reacts with the methanol to produce electricity, such as fuel cells disclosed in U.S. Pat. Nos. 6,727,016 and 6,696,189, which are hereby incorporated herein by reference. Active systems are more complicated and consume electrical power from the stack: these are better suited for larger fuel cells. However, passive DMFCs have a simpler structure that requires no pump or fan, and that uses passive methods to deliver and circulate methanol and oxygen in the cell stack, such as fuel cells disclosed in U.S. Pat. No. 6,737,181, U.S. Pat. No. 6,632,553, U.S. Pat. No. 6,596,422 and U.S. Pat. No. 6,566,003, which are hereby incorporated herein by reference.

Currently, one of the most fundamental limitations of direct methanol fuel cells is that the fuel supplied to the anode of the DMFC must be a very dilute aqueous methanol solution (usually 0.5~1.5 M, which is translated into a methanol mass concentration of 1.6% to 4.8%). If the methanol concentration is too high, a methanol crossover problem will occur, which can significantly reduce the efficiency of the fuel cell and considerably shorten the life of the proton conductive membrane. Conversely, if a DMFC were filled with a dilute aqueous methanol solution, the fuel cell operation time per refueling would be very short, considerably diminishing the advantage of a DMFC over a conventional battery.

Figure 1:
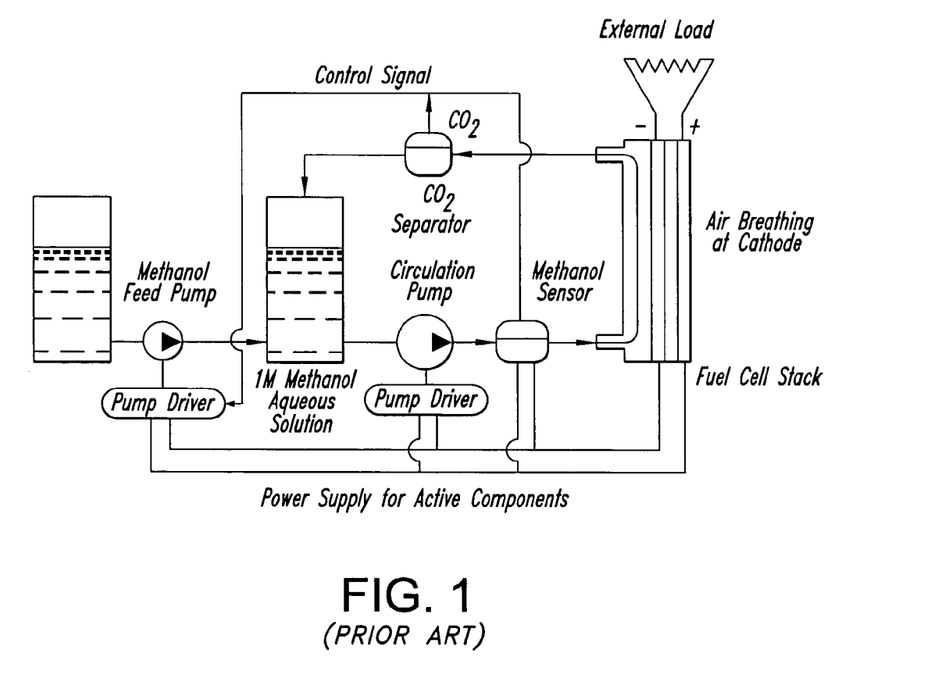
FIG. 1 is a schematic of a typical actively driven DMFC in the prior art.

To overcome this difficulty, a complex active driven DMFC system based on the modern micro system technology was developed. As illustrated in FIG. 1, a typical prior art active driven air-breathing DMFC system is composed of the following components: fuel cell stack, methanol sensor, carbon dioxide ($CO_2$) separator, electronic controls, methanol feed pump, circulation pump and pump drivers.

An active driven fuel delivery system adds considerable cost to the fuel cell system and consumes considerable amounts of electricity from the fuel cell, which in turn significantly reduces the net power output of the fuel cell. As a result, the active driven DMFC is not competitive relative to the conventional battery technology in terms of cost and power output.

One alternative to active driven systems is to operate DMFC systems passively. Several approaches were examined for passive operation of a DMFC. The first involves using a polymer membrane with reduced methanol crossover (e.g., systems provided by Polyfuel and Samsung). The second method involves delivery of methanol fuel to the anode by certain passive ways (e.g., systems provided by MTI, Toshiba, Manhattan Scientific and Florida International University). The third involves use of a liquid electrolyte in lieu of a solid polymer membrane (e.g., systems provided by Medis).

Some of the disadvantages of these systems include the potential for an excessively high methanol concentration due to use of predetermined methanol feed rates based on fuel cell design and not on actual methanol concentration within the fuel cell, the need to recover methanol vapor mixed with carbon dioxide in the effluent prior to release in the ambient air, the temperature sensitivity of the methanol vapor feed, inflexibility, the incompatibility of the system with a wide range of fuel cell sizes, the inconsistent methanol distribution inherent in systems with free-moving liquid and the dependency on system orientation for efficient operation.

Thus, what is needed is a system and method for providing an efficient thermal-fluids management in a DMFC. In particular, a system is needed that incorporates a passive method for fluid transport in a DMFC which can supply neat methanol to the cell with uniform distribution, transport water ($H_2O$) from the cathode (air) side to the anode (fuel) side, supply oxygen to the cell with uniform distribution across the cell, and release carbon dioxide from the cell. Additionally, a system is needed in which the methanol feed rate is based on actual methanol concentration within the DMFC.

A system is also needed in which the methanol and water are maintained in the liquid phase, but preferably not freely moving through the system, thus eliminating the methanol feed temperature constraints, operational dependency on physical orientation, and need for separation of methanol vapor from carbon dioxide. Such a system must also provide uniform fluid distribution. Any system satisfying the above needs must also be capable of use in DMFCs of various sizes.

It should be readily apparent that a system and method meeting the aforementioned needs would provide higher efficiency operation and yield advantages in fuel cell applications which may not have been contemplated due to the limitations of prior art systems and methods, including those described above.

SUMMARY OF THE DISCLOSURE

The present invention improves upon and solves the problems associated with the prior art by providing, among other things, a system and method that addresses the above identified needs.

In particular, a system in accordance with the present invention as described herein provides a thermal-fluids management system for a DMFC. It provides passive methods to transport reactants and byproducts, a mechanism to store the reactants (methanol and water) and methods for controlling methanol concentration in the catalyst layer. Methanol and water are stored in hydrophobic and hydrophilic media, respectively. A methanol concentration gradient, established between the neat methanol storage medium and the anode catalyst layer, delivers methanol to the anode catalyst layer. Capillary action dominates the liquid movement in the porous media, which provides for uniform distribution throughout the DMFC. Furthermore, gravity and orientation have no effect on operationally efficiency, enabling the DMFC to function in any physical direction with high stability. Preferably, the system and methods of the present invention are used in conjunction with smaller DMFCs (i.e., about 0 to about 10 Watt power output), but can be expanded to DMFCs of various sizes, such as about 10 to about 20 Watt or more power output cells.

A thermal-fluids management system constructed in accordance with the present invention further provides for the proper transport of fluids (e.g., methanol, water, oxygen, and carbon dioxide) within the DMFC. Preferably, the system of the present invention is incorporated in a small DMFC, as described above. In particular, the present invention provides a system and method, which can be ancillary or incorporated into a DMFC, for passively supplying neat methanol to the cell with uniform distribution across the cell, achieving passive transport of water within the cell from the cathode (air) side to the anode (fuel) side, passively supplying oxygen to the cell with uniform distribution, passively releasing carbon dioxide out of the cell, storing neat methanol in the cell, storing water in the cell, ensuring the cell works efficiently and with high stability in various physical orientations (such as for example, in small DMFCs which are usually used as portable power sources, requiring the cell to work with high stability in various orientations), and controlling methanol concentration in the anode catalyst layer, among other things.

In one aspect, the present invention is directed to a passive thermal fluids management system for a DMFC having a cathode, anode and methanol and water dispersed therein. The system includes a methanol storage medium operatively associated with the DMFC and configured to receive, temporarily store and permit the egress of methanol, and a mixing medium operatively associated with the DMFC and configured to receive, temporarily store and permit the egress of methanol and water in the DMFC. In this system, the methanol storage medium is adjacent the mixing medium and mixing medium is adjacent the anode of the DMFC for supplying methanol and water to the anode as fuel for the DMFC.

Embodiments of the aforementioned system can include a methanol distribution medium positioned between the methanol storage medium and the mixing medium. The methanol distribution medium of the present invention is operatively associated with the DMFC and configured to receive and distribute the methanol between the methanol storage medium and mixing medium.

The methanol storage medium and methanol distribution medium, if any, preferably have substantially hydrophobic characteristics. Preferably, if a methanol distribution medium is included, the methanol storage medium has a porosity that is greater than or equal to the porosity of the methanol distribution medium. The mixing medium preferably has substantially hydrophilic characteristics.

In another embodiment, the aforementioned system can include a layer disposed adjacent the methanol storage medium which is configured to alter the characteristics of methanol flow between the methanol storage medium and the methanol distribution medium. Preferably, the layer is substantially solid and restricts methanol flow, and may also include a porous conduit disposed therein for facilitating methanol transfer.

In another aspect the present invention is directed to a DMFC comprising a cathode gas diffusion layer, an anode gas diffusion layer, a methanol storage medium configured to receive, temporarily store and permit the egress of methanol, and a mixing medium disposed adjacent the anode gas diffusion layer and methanol storage medium. The mixing medium is configured to receive methanol and water, permit the methanol and water to mix and allow the methanol and water to transfer to the anode gas diffusion layer.

Embodiments of the aforementioned DMFC can include a methanol distribution medium disposed adjacent the methanol storage medium and mixing medium. The methanol distribution medium is configured to receive methanol and distribute the methanol from the methanol storage medium to the mixing medium with a substantially uniform flow profile.

The present invention can also include devices or systems for supplying oxygen to the DMFC or for releasing carbon dioxide from the cell. A layer disposed adjacent the methanol storage medium and the methanol distribution medium that is configured to adjust methanol flow between the methanol storage medium and the mixing medium can also be included in the aforementioned DMFC. The layer may be substantially solid and restrict methanol flow from the methanol storage medium to the methanol distribution medium. In addition, a porous conduit can be disposed in the layer for facilitating methanol transfer therethrough.

In the DMFC, the methanol storage medium and methanol distribution medium, if any, preferably have substantially hydrophobic characteristics. Preferably, if a methanol distribution medium is included, the methanol storage medium has a porosity that is greater than or equal to the porosity of the methanol distribution medium. The mixing medium preferably has substantially hydrophilic characteristics.

In yet another aspect, the present invention is directed to a DMFC having anode and cathode gas diffusion layers, a porous hydrophobic methanol storage medium configured and dimensioned for containing a supply of neat methanol therein, a porous hydrophobic methanol distribution medium in fluid communication with the methanol storage medium, which is configured and dimensioned for uniformly distributing methanol to the anode gas diffusion layer, and a porous hydrophilic mixing medium positioned between the anode and the methanol distribution medium which is configured and dimensioned for receiving methanol from the methanol distribution medium and water as a byproduct of fuel cell operation and facilitating mixing of the water and methanol therein.

Embodiments of this DMFC can also include a substantially liquid impervious layer positioned between the methanol storage medium and the methanol distribution medium, and at least one conduit extending through the liquid impervious layer configured to facilitate methanol flow between the methanol storage medium and the methanol distribution medium. The conduit can be porous and hydrophobic Embodiments of this DMFC can further include a sensing device positioned adjacent the anode for collecting data that facilitates determining methanol concentration, and a device or system for restricting the flow of methanol from the methanol storage medium based on measurements obtained from the sensing device. In addition, the methanol storage medium of this DMFC can be in fluid communication with a methanol supply source.

These and other aspects of the present invention will become more readily apparent to those having ordinary skill in the art from the following description of the invention taken in conjunction with the drawings.

BRIEF DESCRIPTION OF THE FIGURES

So that those having ordinary skill in the art to which the present invention pertains will more readily understand how to make and use the present invention, an embodiment thereof will be described in detail with reference to the drawings, wherein.

DETAILED DESCRIPTION OF THE INVENTION

It is to be understood that the system and method of the present invention may be constructed with or retrofitted onto a variety of fuel cell types. The exemplary and preferred aspects of direct methanol fuel cells of the present invention are provided for purposes of illustrating the features of the instant invention, and should not be construed as limiting the scope of the invention in any manner.

By way of background, in a low temperature range DMFCs are operated with a liquid water and methanol mixture at the anode and air at the cathode. The electro-chemical reactions that occur in the DMFC are shown below:

At the anode, oxidation of methanol takes place:

$$CH_3OH + H_2O \rightarrow CO_2 + 6H^+ + 6e^- \quad (1)$$

And the oxygen is reduced at the cathode according to:

$$6H^+ + 6e^- + 1.5O_2 \rightarrow 3H_2O \quad (2)$$

The overall reaction in the cell is $$CH_3OH + 1.5O_2 \rightarrow CO_2 + 2H_2O \quad (3)$$

Fluids involved in small DMFC operation include reactants (i.e., $CH_3OH$, $H_2O$ and $O_2$) and byproducts (i.e., $CO_2$, $H_2O$).

Figure 2:
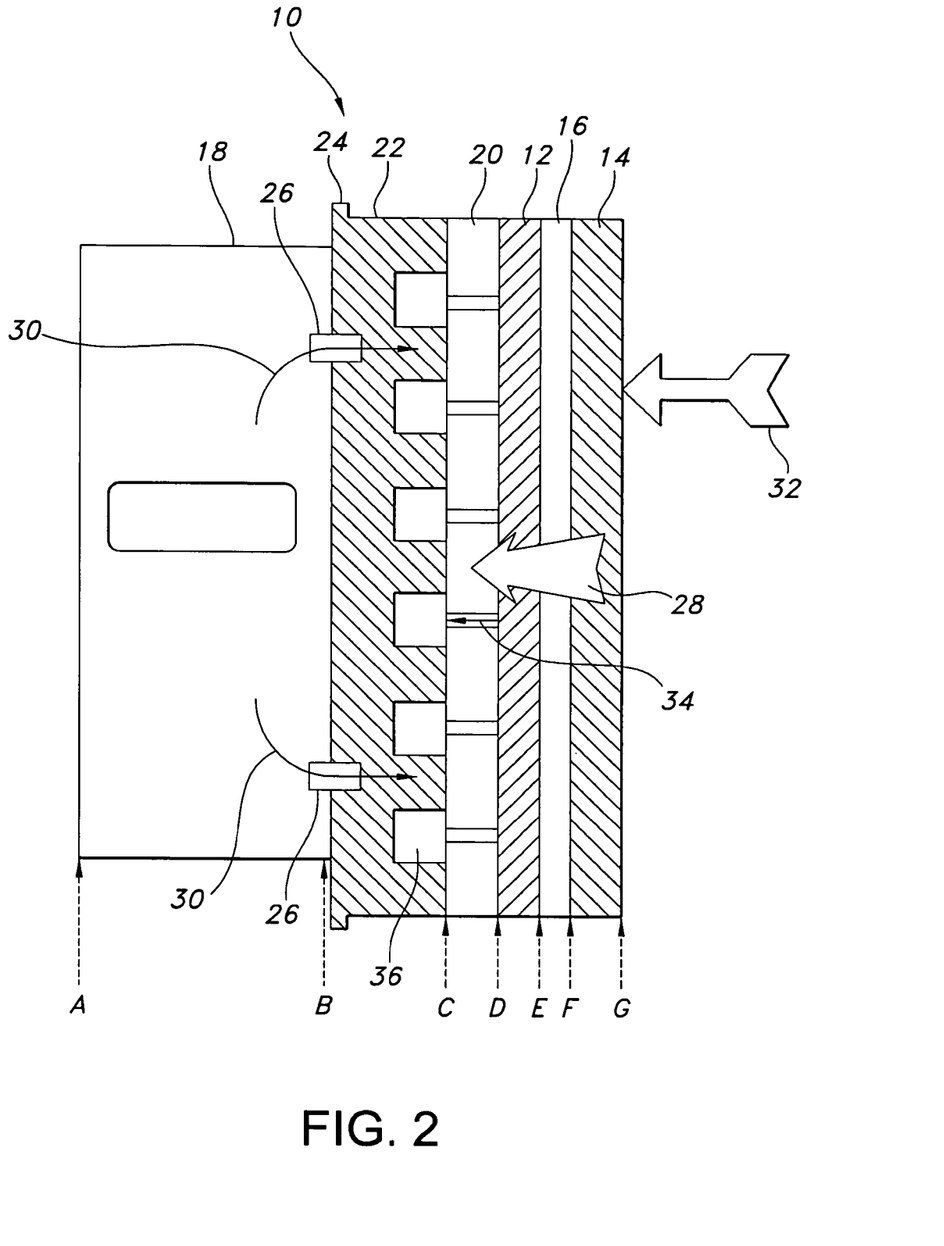
FIG. 2 is a schematic of a thermal-fluids management system for a small DMFC constructed in accordance with the present invention.

Reference is made to FIG. 2, wherein a DMFC 10 of the present invention including a thermal-fluids management system therein is illustrated. Reference is also made to points of interest relating to DMFC 10 designated in FIG. 2 by letters A, B, C, D, E, F, and G, respectively, each of which generally represent an interface between layers in DMFC 10, as discussed in further detail herein.

In this embodiment of the present invention, DMFC 10 includes an anode gas diffusion layer (or GDL) 12 (hereinafter referred to as anode 12) and cathode GDL 14 (hereinafter referred to as cathode 14), separated by a polymer exchange membrane (or PEM) and catalyst layer (collectively referred to hereinafter as PEM) 16 which facilitates the chemical reactions at the anode and cathode described above.

A methanol storage medium 18 is disposed in DMFC 10 between points A and B, and is configured to at least temporarily store or contain neat methanol. Preferably, methanol storage medium 18 is configured with chemical or physical features, or otherwise, or a combination thereof, to permit passage of methanol in medium 18 but prohibit water therein, that is, it can be wetted by methanol but not water. A mixing medium 20 is disposed in DMFC 10 between points C and D, which is configured with chemical or physical features, or otherwise, or a combination thereof, to receive, temporarily contain and allow passage of methanol and water therein in a manner that permits the methanol and water to contact one another and mix.

In the embodiment shown in FIG. 2, a methanol distribution medium 22 is disposed between points B and C, and thus separates methanol storage medium 18 and hydrophilic medium 20 from each other. Methanol distribution medium 22 is configured with chemical or physical features, or otherwise, or a combination thereof, to receive methanol and allow methanol to pass therethrough while prohibiting water, similar to medium 18. Medium 22 preferably also physically restricts a portion of the methanol flow between methanol storage medium 18 and mixing medium 20, and is also configured with physical features that facilitate a more uniform methanol transfer to mixing medium 20 and DMFC 10 in general.

In this embodiment, a restrictive layer 24 is disposed between methanol storage medium 18 and methanol distribution medium 22 to further facilitate the regulation and distribution of methanol transfer. Restrictive layer 24 is configured with chemical or physical features, or otherwise, or a combination thereof, to restrict fluid flow therethrough, while allowing a regulated amount of methanol transfer between mediums 18 and 22. Layer 24 may be of any conventional design, such as for example, solid with openings to allow a regulated amount of transfer therethrough or partially or fully perforated. In this embodiment, restrictive layer 24 includes porous rods 26 that extend from methanol storage medium 18 to methanol distribution medium 22. Porous rods 26 are preferably formed of a material similar in properties to mediums 18 and 22, in that it allows methanol transfer but is resistive to water.

During operation of DMFC 10, water from cathode 14 is transferred to the mixing medium 20 as shown by arrow 28, substantially as methanol is transferred via porous rods 26 from methanol storage medium 18 to methanol distribution medium 22, as shown by arrows 30, by gradient forces within the DMFC 10. A mixture of methanol and water is formed in the region of the mixing medium 20 and the anode catalyst layer (not specifically shown) of anode 12. The mixture of methanol and water is supplied to the anode 12, and methanol is used as fuel to generate electric power. It is important to note that water is needed for the reaction at the anode 12, but there is a net production of water in the overall reaction. DMFC 10 can self-supply water, that is, water produced at the cathode 14 is reused at the anode 12. Ambient air contacts cathode 14 as shown by arrow 32, while $CO_2$, which is generally produced and accumulated at anode 12, moves through DMFC 10 generally as shown by arrow 34.

Preferably, methanol distribution medium 22 includes channels 36 for the purpose of venting $CO_2$. Mixing medium 20 may also include vent holes designed to release $CO_2$ to the ambient air when the pressure in anode 12 is increased to a certain level. Alternatively, a one-way check valve can be used to facilitate the release of $CO_2$. The valve can be configured to open for a period of time once the pressure in anode 12 reaches a predetermined level. This valve may also include a semi-gas-permeating membrane to prevent the loss of liquid fluids (i.e., methanol and water) within DMFC 10 during the process of releasing $CO_2$.

The materials used in DMFC 10 to form the thermal fluids management system of the present invention can include a variety of substances. Methanol, with a low surface tension (22.65 mN/m at 20° C.), wets most solid surfaces. For instance, methanol can wet Teflon®, and most hydrophobic materials. In contrast, water, with a relatively high surface tension (72.88 mN/m at 20° C.), is a non-wetting liquid for these hydrophobic materials. Thus, mediums 18 and 22 can be constructed of hydrophobic materials that can be wetted by methanol but not wetted by water. Mixing medium 20 is constructed of a material that can be wetted by both water and methanol. Preferably, the materials used for mediums 18, 20 and 22 are substantially porous to enable containment and passage of vapor or liquid. If the materials used are hydrophobic, hydrophilic and porous, methanol will fill both the hydrophobic and hydrophilic mediums, while water will fill only hydrophilic media.

Hydrophobicity is an inherent property for many polymers, notably polyethylene and polytetrafluoroethylene (Teflon). Hydrophobic aerogels are special porous materials with extreme micro porosity on a micron scale that can be fabricated so that liquid water does not readily wet the surface. In accordance with the present invention, these hydrophobic porous media are preferably used as methanol storage medium 18 because, among other things, methanol preferentially wets the surfaces of the media and is drawn within the media by capillary action. The methanol capillary pressure is negative in these porous media. In contrast, hydrophobic porous media naturally repel water, thus water capillary pressure is positive in hydrophobic media.

Other materials, such as carbons and inorganic oxides, are hydrophilic. The hydrophilicity of porous media can also be achieved by hydrophilic treatment, as shown in U.S. Pat. Nos. 5,840,414 and 6,733,841, which are incorporated herein by reference. Hydrophilic porous media are good water or water/methanol mixture carriers.

The methanol storage medium 18 preferably has a porosity which is higher than about 0.5, and even more preferably in the range of about 0.7 to about 0.9. The desirable liquid holding capability of methanol storage medium 18 is preferably higher than about 4.0 to about 5.0 g (methanol) per gram of the dry material used to construct methanol storage medium 16, and even more preferably in the range of about 8.0 to about 10.0 g (methanol) per gram of the dry material used to construct methanol storage medium 18. The desirable average pore size range of the methanol storage medium 18 is from about 10 to about 50 µm. The methanol storage medium 18 can be constructed of any inert material or combination of materials having the aforementioned characteristics.

The methanol distribution medium 22 preferably has a porosity of less than about 0.5, and even more preferably in the range of about 0.1 to about 0.3. The desirable liquid holding capability of methanol distribution medium 22 is preferably less than about 1.0 g (methanol) per gram of the dry material used to construct methanol distribution medium 18, and even more preferably in the range of about 0.1 to about 0.3 g (methanol) per gram of the dry material used to construct methanol distribution medium 22. The contact angle between water and methanol distribution medium 22 is preferably greater than about 90°, and even more preferably greater than about 105°. The contact angle between methanol and methanol distribution medium 18 is less than about 90°, and even more preferably less than about 50°. The desirable average pore size range of the methanol distribution medium 18 is about 10 to about 20 µm. The methanol distribution medium 22 can be constructed of any inert material or combination of materials having the aforementioned characteristics.

The mixing medium 20 preferably has a porosity that is higher than about 0.5, and even more preferably in the range of about 0.7 to about 0.9. The desirable liquid holding capability of medium 20 is preferably higher than about 8.0 to about 10.0 g (water) per gram of the dry material used to construct mixing medium 20, and even more preferably in the range of about 15.0 to about 20.0 g (water) per gram of the dry material used to construct mixing medium 20. The desirable average pore size range of mixing medium 20 is preferably about 10 to about 50 µm.

Figure 3:
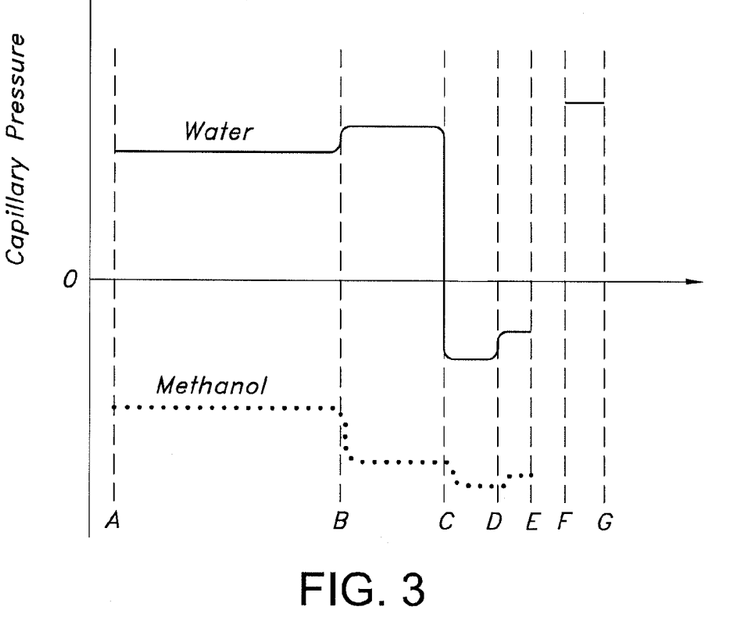
FIG. 3 is chart illustrating the capillary pressure distributions in the small DMFC of FIG. 2.

FIG. 3 illustrates the manner in which capillary pressure in DMFC 10 varies from points A to G, as exemplified by the changes in water and methanol flow therein. Methanol substantially wets mediums 18 and 22, respectively. The methanol capillary pressure in mediums 18 and 22 (i.e., between A and B, and B and C, respectively) is negative. As a result, methanol can be drawn into mediums 18 and 22 spontaneously. Also, the capillary pressure in mixing medium 20 (i.e., between C and D) is less than in mediums 18 and 22, which forms a gradient that facilitates methanol transfer to mixing medium 20 where it can be mixed with water. Thus, methanol consumed as fuel by DMFC 10 is replenished to mixing medium 20 at substantially the same rate and exposed to the adjacent anode 12. Also, the mixing medium 20 will have the lowest negative capillary pressures for both water and methanol during operation of DMFC 10, thus a water/methanol mixture once formed will be trapped in the mixing medium 20 and available to anode 12 and the water will be further barred from mediums 18 and 22.

Figure 4:
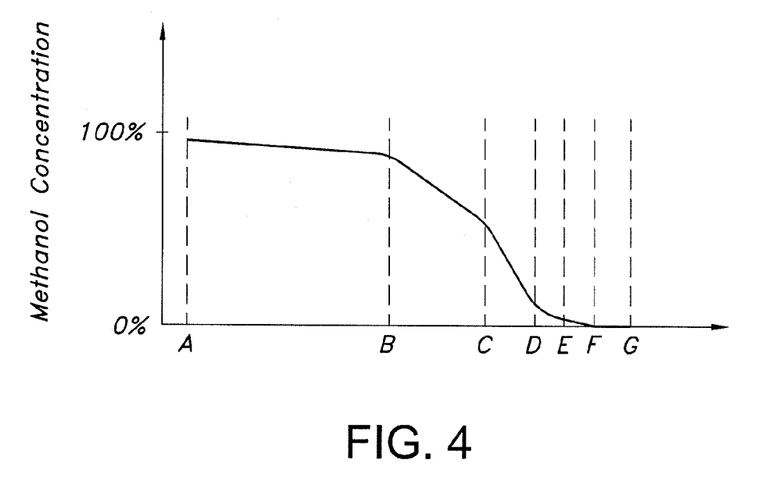
FIG. 4 is a chart illustrating the methanol concentration distributions in the small DMFC of FIG. 2.

FIG. 4 illustrates the manner in which the concentration of methanol varies at points A to G under typical operating conditions. As mentioned above, the methanol concentration gradient facilitates transfer of methanol to mixing medium 20, where it is mixed with water and exposed to anode 12 at point E. As expected, the methanol concentration is highest in the methanol storage medium 18 and lowest in the cathode 14, that is, between points F and G, with a significant reduction in concentration caused by the electrochemical reaction. While the methanol concentration at point F (the cathode 14) is low, it is not zero, meaning that some methanol has crossed over PEM 16 (between points E and F) and reached cathode 14 without being used up at anode 12 and supplying current to the load.

To reduce the methanol crossover, the concentration of methanol allowed to transfer from methanol storage medium 18 to replenish the supply to anode 12 can be further fine-tuned in accordance with the present invention. A methanol concentration sensor (not shown in the figures) can be installed in DMFC 10, preferably at a location adjacent to anode 12, to monitor the concentration of methanol therein. An example of a methanol concentration sensor device for use in accordance with the present invention is discussed herein below. A micro-actuator, ideally constructed using Micro Electro Mechanical Systems (MEMS) fabrication techniques, can be located either proximate to or possibly within at least one of porous rods 26, which can be made of flexible materials. An exemplary methanol sensor in accordance with the present invention is described further below.

Thus, in operation, as the micro-actuator receives a signal from the methanol sensor, it can be configured to apply pressure to or reduce the cross-section of the porous rods 26, thereby restricting the flow of methanol therethrough. It should be readily apparent that other mechanisms can be employed by the present invention to control, or temporarily reduce or restrict the flow of methanol through one or more porous rods 26 in response to a signal from the methanol sensor according to the present invention.

Water at the cathode 14 arises from the electrochemical reaction at the cathode as shown in Equation (2) above, the electro-osmotic drag and diffusion of water through PEM 16 from the anode 12 to the cathode 14 and/or the chemical reaction of air and methanol, which permeates through PEM 16 from the anode 12 (methanol crossover) to the cathode 14. In the low-temperature range, liquid water will accumulate in the region between PEM 16 and cathode 14 as shown at point F. Several commercial gas diffusion layers are available for use in a DMFC operation. Most of them are hydrophobic and function as liquid-water barrier layers, such as layers in the cathode 14 between points F and G.

Hydraulic pressure, which is developed in the PEM 16 and cathode 14 will force portions of liquid water towards anode 12 and portions of liquid water towards cathode 14. This process depends on the properties of the anode 12 and cathode 14. If the anode and/or cathode 12 and 14, respectively, have a smaller average pore size and/or a higher water contact angle, a higher hydraulic pressure is generated and more water is forced back towards anode 12. An optimal design of anode 12 and cathode 14 can achieve a water balance operation of DMFC 10, eliminating the need to add water to the cell.

Small DMFCs, such as DMFC 10, typically have low working temperatures and low current densities. The air-breathing mode of DMFC 10 is sufficient to provide air to the cell if no flooding occurs. The trade-off between higher air permeability and higher capability to obstruct liquid-water transport through anode 12 and/or cathode 14 (for water recycling purposes) is needed in DMFCs and provided by the present invention.

Figure 5:
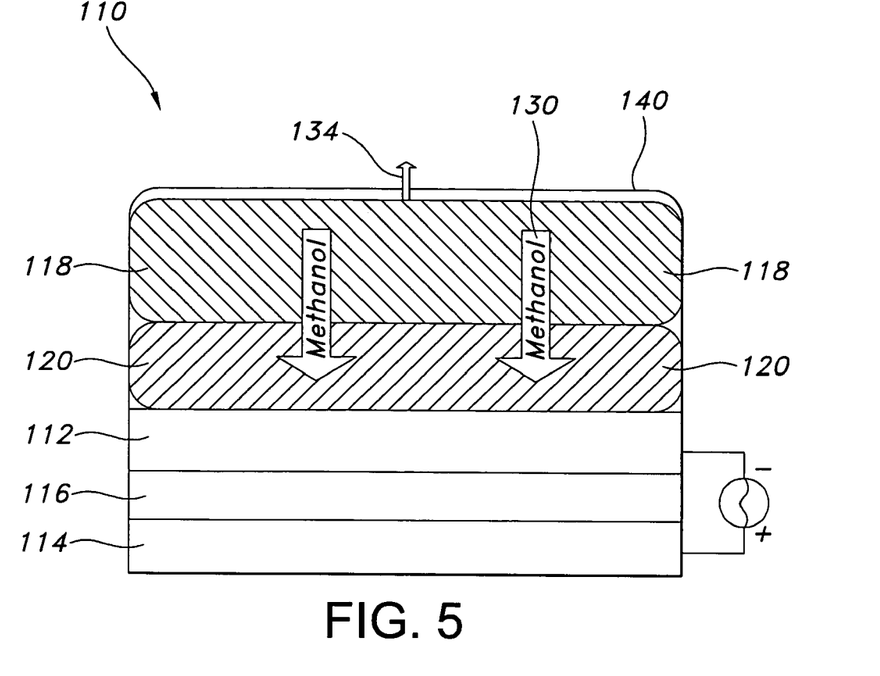
FIG. 5 is a schematic diagram of another embodiment of a passive DMFC constructed in accordance with the present invention without a methanol distribution medium.

FIG. 5 illustrates DMFC 110 constructed in accordance with an alternative embodiment of the present invention. DMFC 110 does not include a liquid resistant layer or methanol distribution medium, such as that described in the embodiment of FIG. 2, between methanol storage medium 118 and mixing medium 120. Thus, methanol diffuses from the methanol storage medium 118 directly to mixing medium 120 due to the methanol concentration gradient formed in DMFC 110 and methanol storage medium is preferably configured to distribute methanol substantially uniformly to mixing medium 120. DMFC 110 includes a cover 140 which may be made of any conventional material used in fuel cell construction that permits air entry at cathode 114 and $CO_2$ release from DMFC 110 as illustrated by arrow 134.

Figure 6:
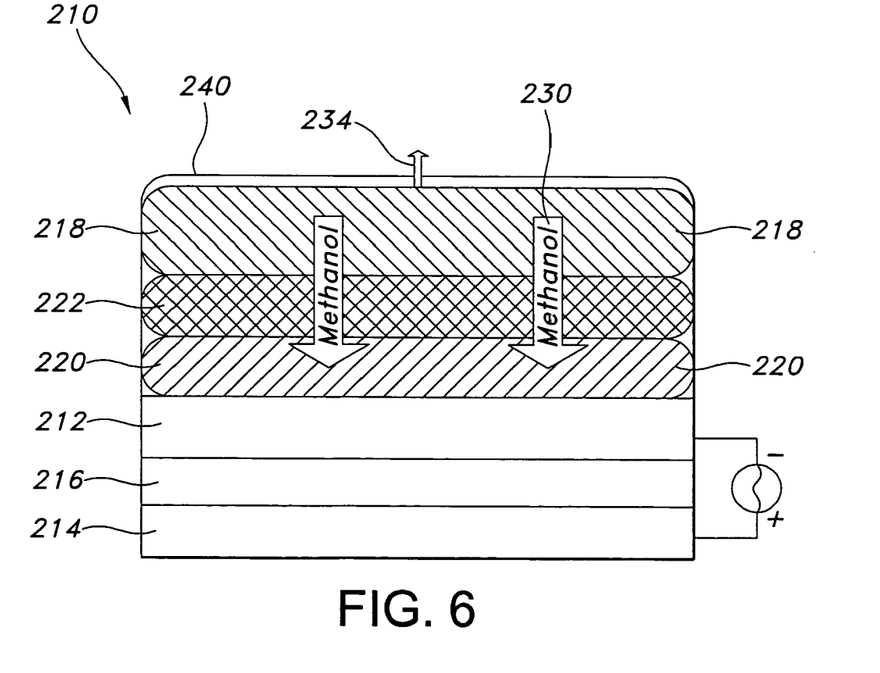
FIG. 6 is a schematic diagram of another embodiment of a passive DMFC constructed in accordance with the present invention including a methanol distribution medium.

FIG. 6 shows a passive DMFC 210 of the present invention with a methanol distribution medium 222 as in the embodiment of FIG. 2, but without a fluid resistant layer positioned between first medium 218 and methanol distribution medium 222.

Figure 7:
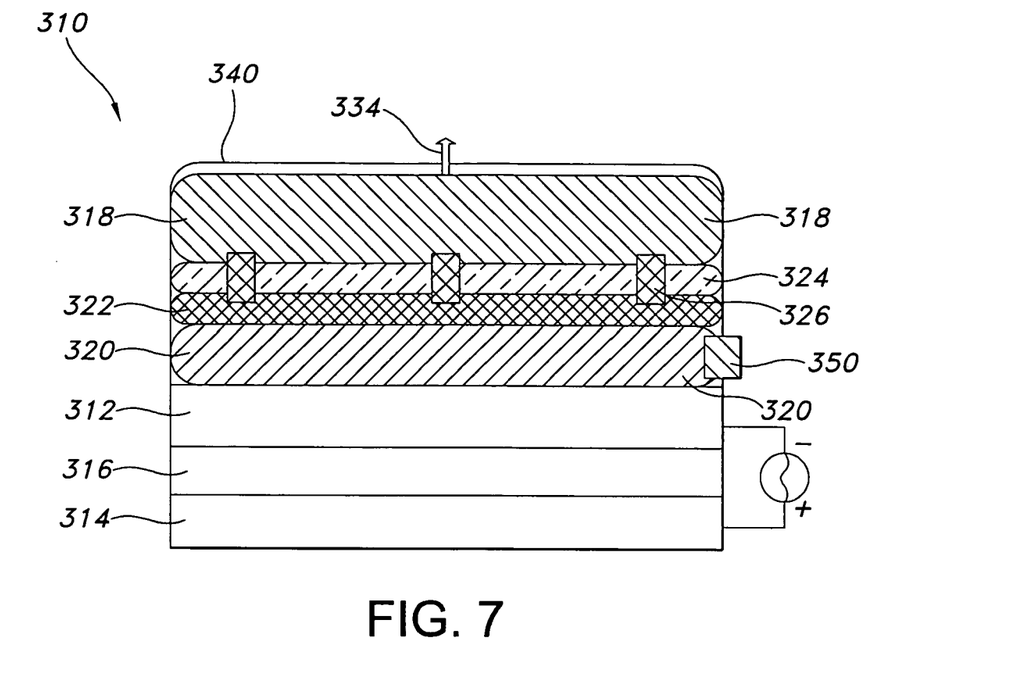
FIG. 7 is a schematic diagram of another embodiment of a passive DMFC constructed in accordance with the present invention including, among other things, a methanol concentration sensor.

FIG. 7 shows a passive DMFC 310 with a methanol distribution medium 318 and a liquid resistant layer 324 having porous rods 326 extending therethrough. DMFC 310 also includes a methanol concentration sensor 350 as described herein. In this embodiment, the methanol concentration sensor 350 is disposed adjacent mixing medium 320 to measure the methanol concentration therein.

Figure 8A:
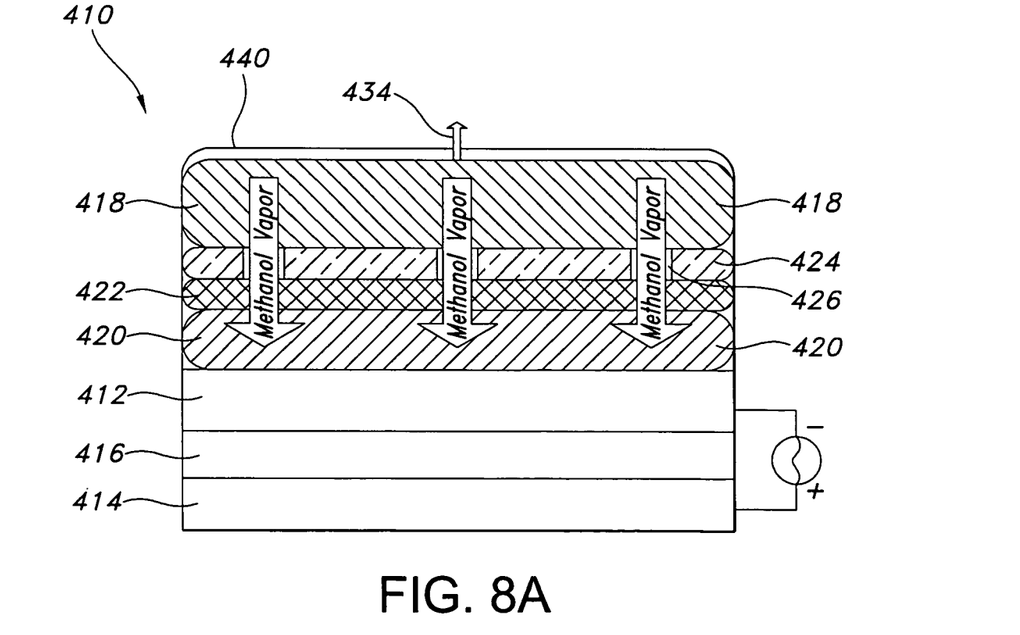
FIG. 8a is a schematic diagram of another embodiment of a passive DMFC constructed in accordance with the present invention, illustrating the transport of vapor methanol from the methanol storage medium through the methanol distribution medium, among other things.

FIG. 8a shows a passive DMFC 410 of the present invention that utilizes vapor fuel delivery. Methanol distribution medium 422 is constructed of a material or materials that render it super hydrophobic in that it can not be wetted by liquid methanol as in the mediums of the previous embodiments, but methanol distribution medium 422 can be penetrated by methanol in vapor form. In this embodiment of the invention, resistant layer 424 is perforated to allow flow therethrough. Methanol vapor from methanol storage medium 418 can travel through the holes in the perforated layer 424 and pores in the methanol distribution medium 422 as part of the vapor fuel delivery system in DMFC 410.

Figure 8B:
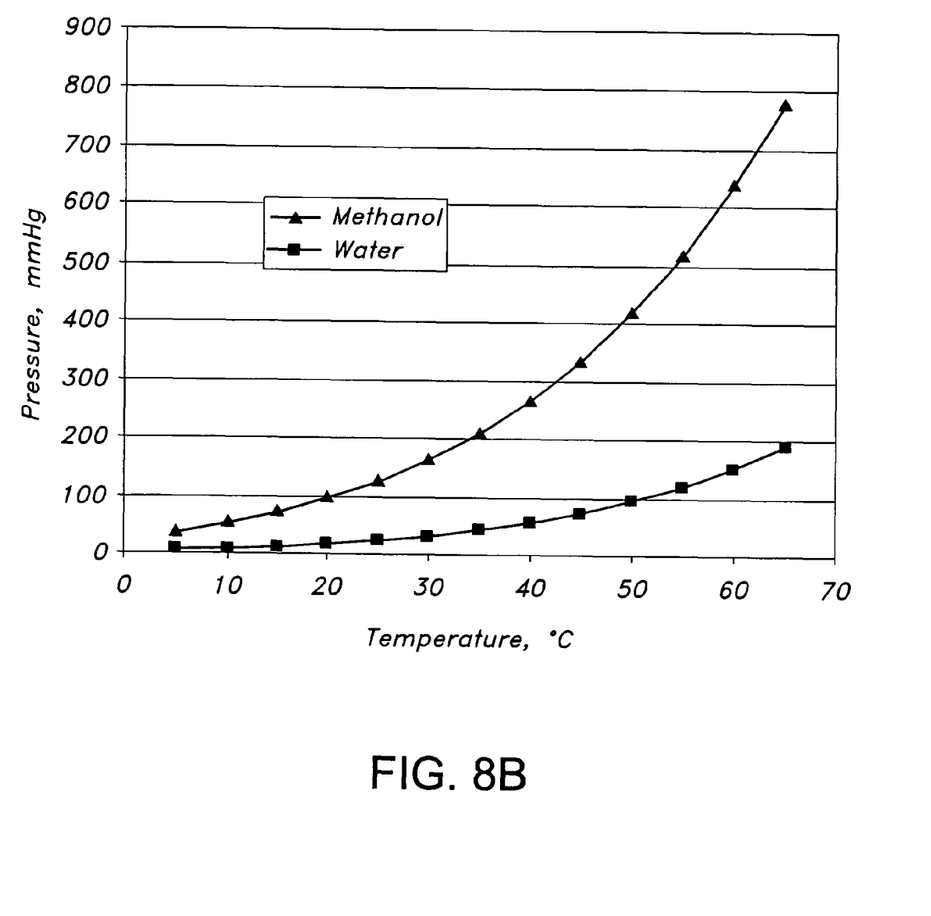
FIG. 8b is a graph comparing the vapor pressures of methanol and water at various temperatures.

As shown in FIG. 8b, methanol has a much higher vapor pressure than water. Methanol vapor in the methanol storage medium 418 penetrates through the holes in the perforated layer 424 and pores in the methanol distribution medium 422. When the methanol vapor arrives at the mixing medium 420, it will condense and mix with the liquid water contained therein. Liquid water diffusion from the mixing medium 420 to the methanol storage medium 418 is blocked by the bubble pressure of the methanol within the methanol transport medium 418 and layer 424.

Figure 9:
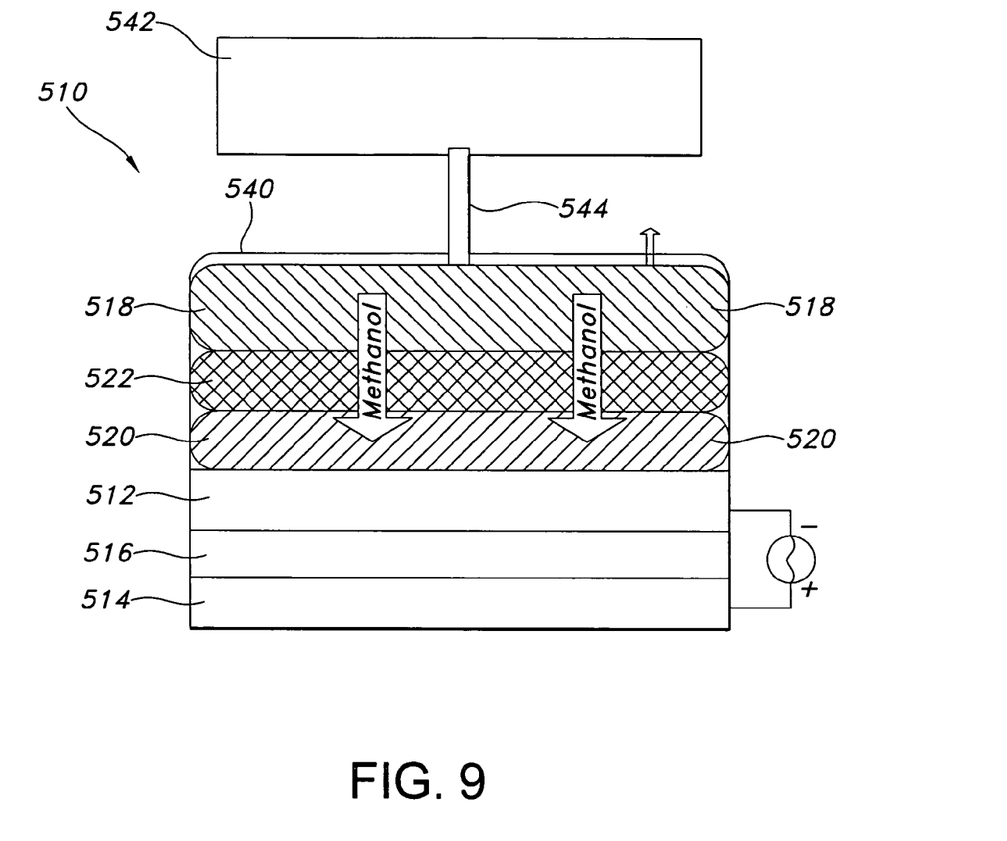
FIG. 9 is a schematic diagram of another embodiment of a passive DMFC constructed in accordance with the present invention, including a methanol supply source attached to the methanol storage medium.

An additional liquid fuel cartridge 542 can be interconnected by conduit 544 to the methanol storage medium 518 as shown in FIG. 9. Thus, as methanol is consumed in DMFC 510, the liquid fuel cartridge 542 can supply methanol to the methanol storage medium 518. Cartridge 542 can be attached with DMFC 510 by any conventional means that allows liquid or vapor transfer from cartridge 542 to methanol storage medium 518. The properties and configurations of the other components in DMFC 510, such as the methanol transfer medium 522 and mixing medium 520, may be adjusted accordingly in consideration of the methanol fuel supply from cartridge 542. Cartridge 542 of any type and can be disengaged from DMFC 510 or refillable with methanol.

A sensor in accordance with the present invention can be incorporated in a thermal fluids management system of the invention in the exemplary manner illustrated and described herein.

The temperature of a fuel cell generally increases during operation, due to the heat released from the electrochemical reaction. For DMFCs, heat is produced from both the electrochemical reaction and from the methanol crossover and oxidation at the cathode side. The total energy released from 1 mol of methanol (in Equation 3 above) is about 726.6 kJ under standard conditions at 25° C. A certain amount of this energy is converted into electrical energy through electrochemical processes and the rest is released as heat. This electrical energy can also be converted into heat energy by using resistance as an external load. If the resistance is very small compared with the internal resistance of the DMFC, the electrical energy produced by the DMFC is converted into heat energy inside the cell. Alternatively, the resistance can be positioned proximate to the cell and the electrical energy can heat the cell. Therefore, heat energy produced in the sensor represents total energy content in the methanol solution, which has a linear relationship with methanol concentration.

The cell temperature rise due to heat production can be expressed as follows:

$$\Delta T = \frac{Q}{A \cdot h}$$

ΔT is the temperature rise above ambient temperature, Q is heat production in the sensor, A is cooling surface area and h is heat transfer coefficient. Because the cell works in passive flow mode, the heat is released to the ambient air by natural convection. The heat transfer coefficient is nearly constant in most circumstances. Therefore, the cell temperature rise above the ambient temperature is dependent mainly upon the methanol concentration.

Heat transfer in the DMFC is limited by natural convection and the cell temperature rise has a linear relationship with heat produced by the sensor, which in turn is related linearly to the methanol concentration in the aqueous solution.

A method of measuring concentration of the methanol solution in accordance with the present invention includes the step of dropping a small amount of methanol solution (the solution is at ambient temperature) on the anode side of a micro passive DMFC, measuring the maximum temperature rise of the micro passive DMFC above the ambient temperature, and calculating the concentration of methanol in the solution based on the above measurement and predetermined calibration.

The above procedure is for discrete or a non-continuous mode. However, the sensor also can work in a continuous mode if the methanol solution passes slowly through the DMFC. This will ensure the methanol in the methanol solution is completely converted to heat and the forced flow heat transfer coefficient is small.

Figure 10:
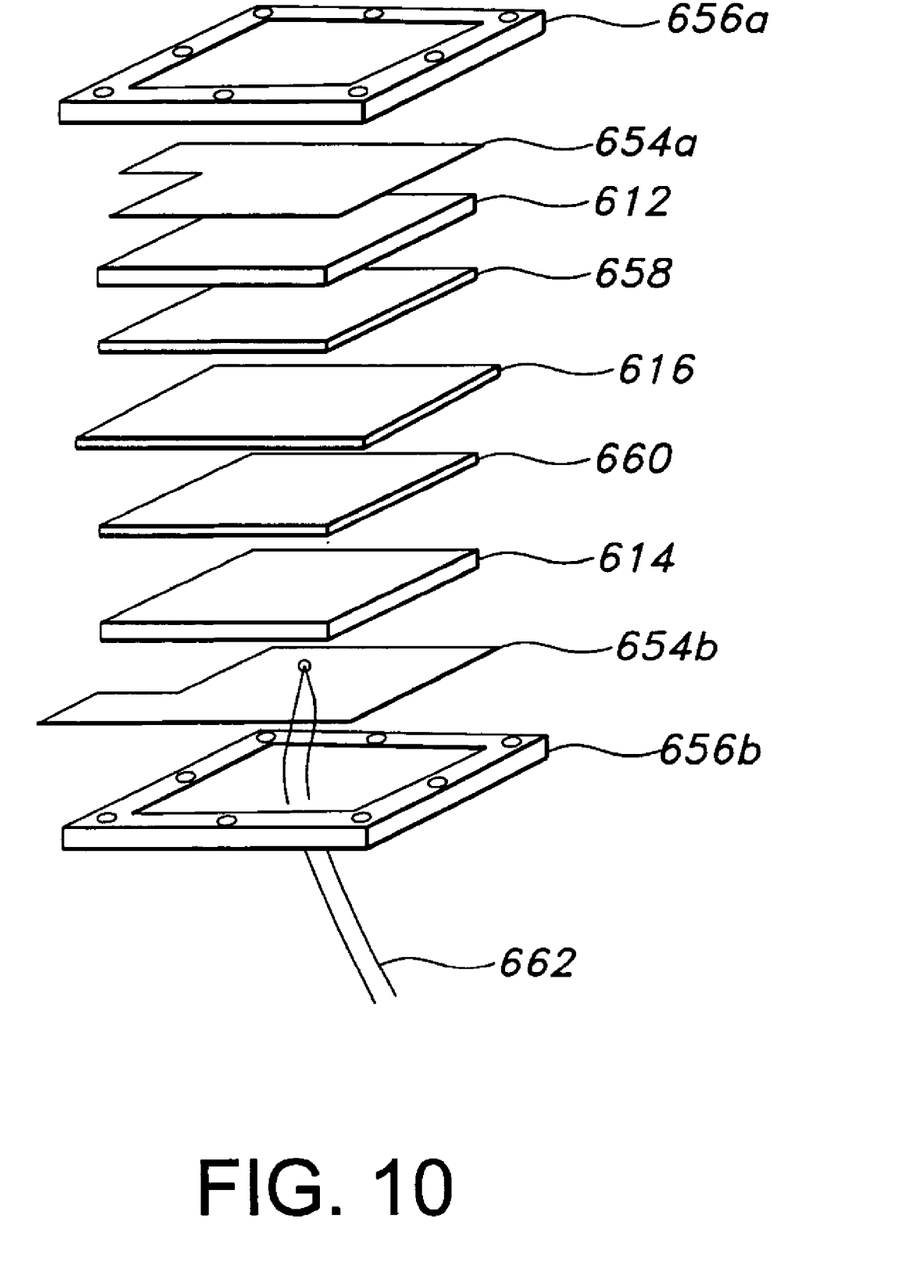
FIG. 10 is an exploded schematic diagram of micro DMFC used to illustrate an exemplary methanol sensor constructed in accordance with the present invention.

For example, a micro passive DMFC 610 as shown in FIG. 10 was used in experimental testing. This unit consists of a Nafion® 117 proton exchange membrane 616, gold plated stainless steel expanded mesh 654a and 654b, and fiberglass fixture frame 656a and 656b. The cathode GDL 614 is Ballard P50T carbon paper. A carbon cloth is used as the anode GDL 612 at the anode side. The cell was assembled by sandwiching (from anode 612 to cathode 614) metal mesh 654a, carbon cloth anode 612, Nafion 117 membrane 616 (along with anode side catalyst layer 658 and cathode side catalyst layer 660 disposed adjacent thereto), P50T carbon paper cathode 614, metal mesh 654b between two fiberglass fixtures 656a and 656b. The two fiberglass fixtures 656a,b were tightened by 8 screws. The micro passive DMFC 610 constructed had an active area of 6.25 cm². A thermocouple 662 was disposed between metal mesh 654b and carbon paper cathode 614.

The testing was done at a room temperature of 22° C. The methanol solutions used in the testing are 1M, 2M, 3M, 5M, 7M, and 10M, respectively. For each test, the inventors began by dropping 1 ml methanol solution on the anode. Twelve minutes were allowed for the testing of each solution mentioned above. An electrical resistance of 0.3Ω was used as the external load. A thermocouple embedded in the cathode GDL was used to measure the cell temperature.

Figure 11:
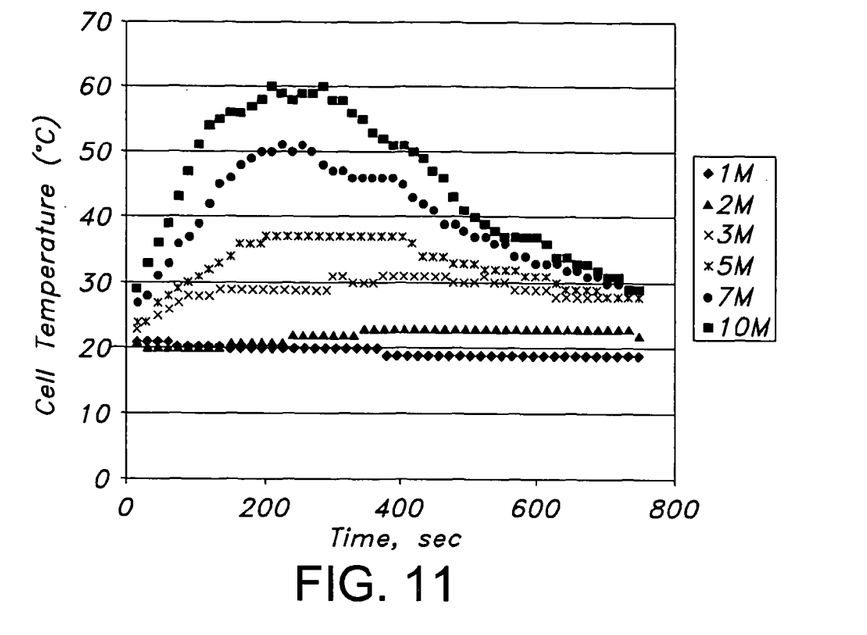
FIG. 11 is a graph based on data relating to the DMFC of FIG. 10, illustrating the changes of cell temperature with methanol concentration relationship of temperature.
Figure 12:
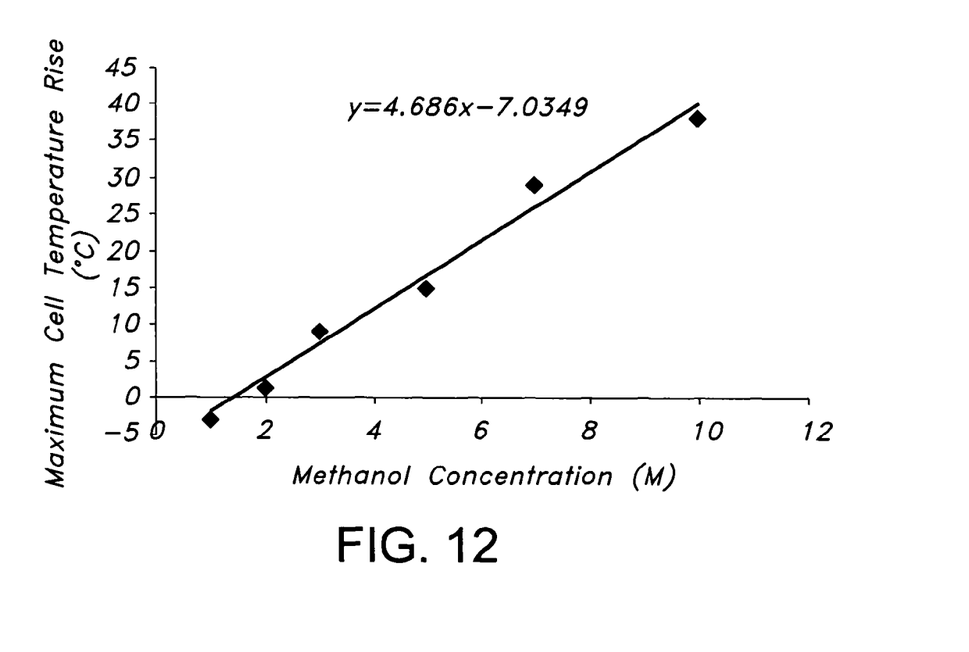
FIG. 12 is a graph based on data relating to the DMFC of FIG. 10, illustrating the maximum temperature rises between the highest cell operating temperature and the room temperature versus methanol concentration.

FIG. 11 shows the cell temperature varies with methanol concentration. For 1M methanol solution, the cell operating temperature is 3° C. lower than the room temperature. This can be explained by the cooling effect of liquid evaporation. For 2M methanol solution, the cell operating temperature is 1° C. above the room temperature. For 3M, 5M, 7M, and 10M methanol solutions, the cell operating temperature increases with time to the highest temperatures and then the cell operating temperatures decline. The maximum temperature rise of the sensor has a linear relationship with methanol concentration, as shown in FIG. 12. Therefore, the maximum temperature rise is used as an indicator of methanol concentration in the methanol concentration sensors of the present invention, and one or more temperature sensors can be incorporated in a DMFC constructed in accordance with the present invention.

Having described embodiments of the present invention, various alterations, modifications, and improvements will be apparent to those of ordinary skill. Such alterations, modifications, and improvements are intended to be within the spirit and scope of the invention. The invention is not limited just to the foregoing disclosure of certain embodiments thereof.

The invention claimed is:

1. A DMFC comprising:
   a. a cathode gas diffusion layer;
   b. an anode gas diffusion layer;
   c. a methanol storage medium, characterized by a first porous layer and configured to receive, temporarily store and permit the egress of methanol; and
   d. a mixing medium, characterized by a second porous layer and disposed adjacent the anode gas diffusion layer and the methanol storage medium or a methanol distribution medium, the mixing medium being configured to receive methanol and water, permit the methanol and water to mix and allow the methanol and water to transfer to the anode gas diffusion layer; and the methanol distribution medium, characterized by a third porous layer disposed between the methanol storage medium and the mixing medium wherein the methanol distribution medium is configured to receive methanol and distribute the methanol from the methanol storage medium to the mixing medium with a substantially uniform flow profile.

2. A DMFC as recited in claim 1, further comprising means for supplying oxygen to the DMFC.

3. A DMFC as recited in claim 1, further comprising means for releasing carbon dioxide from the cell.

4. A DMFC as recited in claim 1, further comprising a restrictive layer disposed between the methanol storage medium and the methanol distribution medium that is configured to adjust methanol flow between the methanol storage medium and the mixing medium.

5. A DMFC as in claim 4, wherein the restrictive layer is substantially solid and restricts methanol flow from the methanol storage medium to the methanol distribution medium.

6. A DMFC as in claim 4 wherein the restrictive layer includes a porous conduit disposed therein for facilitating methanol transfer therein.

7. A DMFC as in claim 1 wherein the methanol storage medium has substantially hydrophobic characteristics.

8. A DMFC as in claim 1 wherein the mixing medium has substantially hydrophilic characteristics.

9. A DMFC as in claim 1, wherein the methanol distribution medium has substantially hydrophobic characteristics.

10. A DMFC as recited in claim 1, further comprising a sensing device positioned adjacent the anode for collecting data that facilitates determining methanol concentration.

11. A DMFC as recited in claim 10, further comprising means for restricting the flow of methanol from the methanol storage medium based on measurements obtained from the sensing device.

12. A DMFC as recited in claim 1, wherein the methanol storage medium is in fluid communication with a methanol supply source.

13. A DMFC as in claim 1, wherein each porous layer contributes to an overall methanol concentration gradient.

14. A DMFC as in claim 13, wherein each porous layer effects a methanol concentration gradient thereby contributing to the overall methanol concentration gradient.

15. A DMFC as in claim 1, wherein negative capillary pressure in the mixing medium is lower than the negative capillary pressure in the methanol storage medium.

16. A DMFC as in claim 15, wherein lower negative capillary pressure in the mixing medium (i) traps the methanol and water mixture in the mixing medium so that the mixture is available to the anode gas diffusion layer, and (ii) ensures that the methanol consumed as fuel by the anode gas diffusion layer is replenished to the mixing medium from the methanol storage medium at substantially the same rate.

17. A DMFC as in claim 15, wherein the methanol storage medium has a greater than or about equal porosity as the methanol distribution medium.

* * * * *